United States Patent [19]

Kakumoto et al.

[11] 4,370,606

[45] Jan. 25, 1983

[54] CHARGING APPARATUS

[75] Inventors: Hiromi Kakumoto; Kaoru Furukawa, both of Hikone, Japan

[73] Assignee: Matsushita Electric Works, Ltd., Osaka, Japan

[21] Appl. No.: 196,014

[22] Filed: Oct. 10, 1980

[30] Foreign Application Priority Data

Oct. 13, 1979 [JP] Japan .................................. 54-132266

[51] Int. Cl.$^3$ ............................................... H02J 7/10
[52] U.S. Cl. ........................................... 320/35; 320/48
[58] Field of Search ........................ 320/22, 23, 35, 36, 320/48, DIG. 2

[56] References Cited

U.S. PATENT DOCUMENTS 3,599,071 8/1971 Lapuyade et al. ..................... 320/35
4,125,802 11/1978 Godard ............................... 320/22 X
4,240,022 12/1980 Kilinskis et al. ....................... 320/23

OTHER PUBLICATIONS

Ball, "There's No Overcharge for Fast-Charged Batteries", Electronics, Jan. 22, 1968, pp. 97-100, 320-335.

*Primary Examiner*—A. D. Pellinen

*Attorney, Agent, or Firm*—Birch, Stewart, Kolasch & Birch

[57] ABSTRACT

A diode is disposed in the vicinity of a rechargeable battery. A current is applied to the diode from a current generating circuit. The current generating circuit comprises a thermistor which is responsive to the ambient temperature, so that a current associated with the ambient temperature is applied from the current generating circuit to the diode. The diode gives rise to a forward voltage drop, which is changeable as a function of the battery temperature. Accordingly, the forward voltage drop across the diode is changeable as a function of the ambient temperature and the battery temperature. The forward voltage drop across the diode is amplified to be used as a reference voltage. On the other hand, the rechargeable battery is supplied with a charging current from a power supply through a thyristor. The gate electrode of the thyristor is connected to receive the reference voltage and the cathode of the thyristor is connected to the battery. Accordingly, the thyristor is turned off if and when the difference between the reference voltage and the battery voltage becomes smaller than the switching voltage of the thyristor.

29 Claims, 30 Drawing Figures

FIG. 1
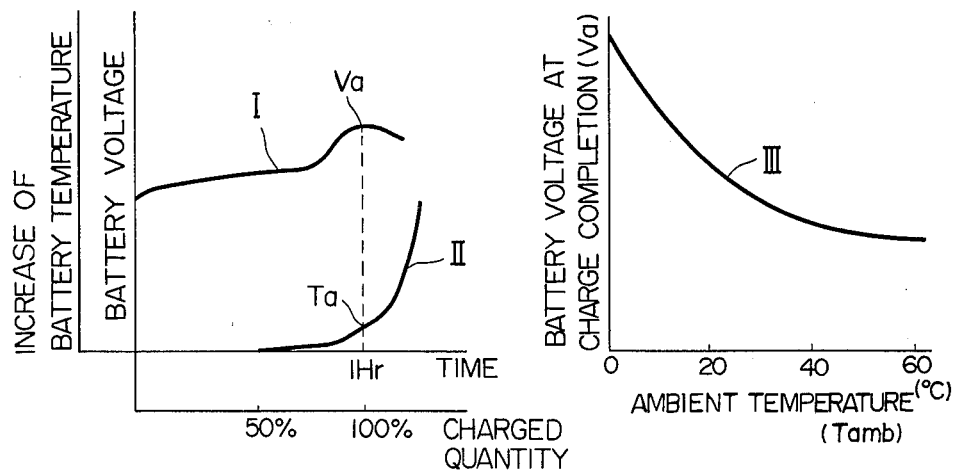
FIG. 2
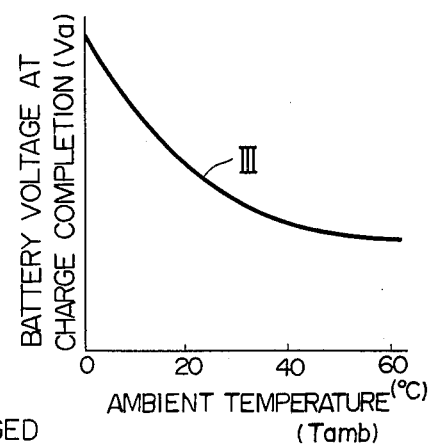
FIG. 3
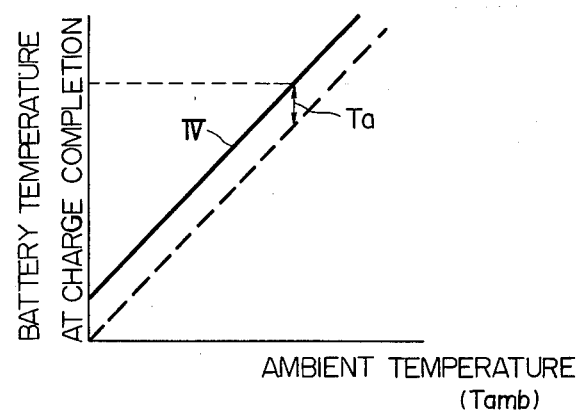
PRIOR ART  FIG. 4
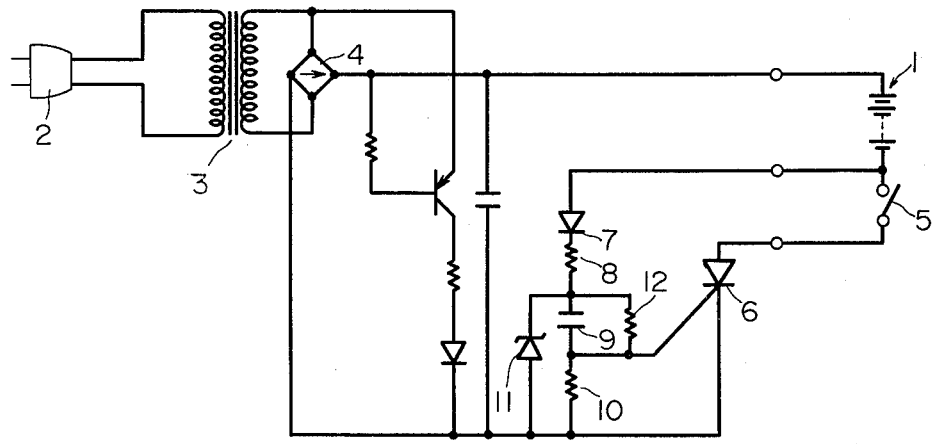

CHARGING APPARATUS

BACKGROUND OF THE INVENTION

1. Field of the Invention

The present invention relates to a charging apparatus. More specifically, the present invention relates to a charging apparatus of a rechargeable battery using an alkali type electrolyte such as a sealed type Ni-Cd battery.

2. Description of the Prior Art

Of late, a motor driven machines having a built-in rechargeable batteries in lieu of a commercial power supplies have been put into practical use. Generally, batteries employing an alkali type electrolytes such as a Ni-Cd have been used as a voltage sources of such motor driven machines. FIGS. 1 to 3 are graphs showing various characteristics in conjunction with charging of such Ni-Cd batteries. More specifically, FIG. 1 is a graph showing a change of a battery voltage and a change of a battery temperature while charging a battery. Referring to FIG. 1, the curve I indicates the battery voltage and the curve II indicates the battery temperature. It is pointed out that FIG. 1 shows the characteristic on the assumption of the charging conditions that both the ambient temperature (Tamb) and the charging current (Ic) are constant. As seen from the curve I in FIG. 1, when the charge quantity with respect to the battery capacity reaches 100%, this means charge completion. The battery voltage when the charge is completed, i.e. the voltage at charge completion is shown as Va and an increase of the battery temperature at the charge completion is shown as Ta. The curve III in FIG. 2 shows a change of the voltage at charge completion (Va) with respect to the ambient temperature (Tamb). The curve IV in FIG. 3 shows an increase of the battery temperature (Ta) at charge completion with respect to the ambient temperature (Tamb). Thus, generally a Ni-Cd battery has a non-linear characteristic of the voltage at charge completion (Va) with respect to the ambient temperature (Tamb). Conversely, an increase of the battery temperature (Ta) at completion exhibits approximately a linear characteristic with respect to the ambient temperature (Tamb).

FIG. 4 is a schematic diagram of one example of a conventional charging apparatus of interest to the present invention. The FIG. 4 apparatus is adapted to control a charging operation as a function of the above described battery voltage. Such charging circuit as similar to FIG. 4 is disclosed as FIG. 2 in Japanese Patent Laying Open Gazette No. 139033/1979, laid open Oct. 29, 1979 for public inspection, which corresponds to United States application, Ser. No. 891,305, filed Mar. 29, 1978, now U.S. Pat. No. 4,240,022. More specifically, an alternating current voltage such as a commercial power supply, received through a plug 2, is transformed by a transformer 3 and is then applied to a full-wave rectifying circuit 4. The full-wave rectifying circuit 4 is connected to a series connection of a battery 1 to be charged, a thermal switch 5 and a thyristor 6. The thermal switch 5 may be of a type operable as a reed switch utilizing a transition at a Curie point such as that of a temperature sensitive ferrite. The thermal switch 5 has been set such that if and when the temperature of the battery 1 reaches a predetermined value, say 47° C., the thermal switch 5 becomes operable, so that the same may be rendered non-conductive.

In operation, at the beginning of a charging operation, the temperature of the battery 1 is low and accordingly the thermal switch 5 has been rendered conductive. When the plug 2 is connected to the commercial alternating current voltage source, a current flows to a capacitor 9 through the rectifying circuit 4, the battery 1 and the diode 7. The capacitor 9 provides a pulse voltage to the gate electrode of the thyristor 6, so that the thyristor 6 is turned on and the battery 1 starts being charged. As the charging time period lapses, the battery voltage increases. When the charged quantity reaches approximately 80% of the battery capacity, the battery 1 gives rise to an increase of internal resistance due to gas pressure generated in the battery. Thereafter the temperature of the battery 1 also increases. When the temperature of the battery 1 reaches a predetermined value, the thermal switch 5 is rendered non-conductive. Accordingly, a trickle charging is started in the battery 1 through the path of the diode 7, the resistor 8, the capacitor 9 and the resistor 10. A charging current on the occasion of the trickle current charging is approximately 1/10C to 1/5C, where C is a battery rate and represents a charging current required for charging the battery in an hour. A zener diode 11 is rendered conductive due to a charging voltage across the capacitor 9 included in the trickle charging path. When the zener diode 11 is rendered conductive, the gate electrode of the thyristor 6 decreases to a voltage too small to turn on the thyristor 6 in cooperation with the resistors 12 and 10. Accordingly, even if the thermal switch 5 is rendered conductive again by a decrease of the temperature of the battery 1, the thyristor 6 will not be turned on again and the battery 1 will not be charged. Thus, with the FIG. 4 apparatus, the temperature of the battery 1 is detected and a charging current is switched from a rapid charging operation to a trickle current charging operation depending on the temperature thereof. However, the operating temperature of the thermal switch of such conventional apparatus is constant irrespective of a change of the ambient temperature. Therefore, the problems to be described in the following are involved.

FIGS. 5A and 5B are graphs for depicting a charging state of a battery in the case where the ambient temperature is high, and FIGS. 6A and 6B are graphs for depicting a charging state of a battery in the case where the ambient temperature is low. Referring to FIGS. 5A and 6A, the curves I and I' show the characteristic of the battery voltage (V) with respect to the charging time, and the curves V and V' show the increase (ΔT) of the battery temperature with respect to the charging time. Referring to FIGS. 5B and 6B, the curves VI and VI' show the charging current (Ic) and the curves VII and VII' show the internal pressure (P) of the battery.

Now consider a case where the ambient temperature (Tamb) is relatively high, say 25° C. On the other hand, it is assumed that the thermal switch 5 has been set to be operable at 47° C. In such a case, when the increase (ΔT) of the battery temperature reaches 22° C., the thermal switch 5 is operable and the charging current is controlled. By selecting the increase (Ta) of the battery temperature at charge completion to be 30° C., the battery will not be overcharged in the case where the ambient temperature is high. By contrast, in the case where the ambient temperature is low, say 0° C., the thermal switch 5 will not be operable, unless the increase (ΔT) of the battery temperature reaches 47° C. Assuming that the increase (Ta) of the battery temperature at charge completion of the battery is 30° C., as described above, then it follows that the thermal switch 5 will be operable at the time point which is much later than the time point of charge completion in the case where the ambient temperature is low. Accordingly, overcharging will result in such a case. If the battery is overcharged, the internal pressure (P) becomes abnormally high, as shown by the curve VII' in FIG. 6B and leakage of the electrolyte is caused and in an extreme case the battery is damaged. Accordingly, in order to eliminate a possibility of overcharging by the FIG. 4 apparatus, in the case where the ambient temperature is low, it is necessary to change the operating temperature of the thermal switch 5 in association with the change of the ambient temperature; however, such a thermal switch has not yet been available.

FIG. 7 is a schematic diagram of another example of a conventional charging apparatus of interest to the present invention. The FIG. 7 apparatus is adapted to control a charging current through comparison of the reference voltage and the battery voltage, by changing the reference voltage (Vref) in association with the ambient temperature (Tamb), and such apparatus is disclosed in Japanese Utility Model Laying Open Gazette No. 22730/1978, for example. The FIG. 7 apparatus is structured such that a series connection of a thyristor 6 and a battery 1 is connected to a full-wave rectifying circuit 4. The FIG. 7 apparatus further comprises a voltage comparator, i.e. a differential amplifier 14. The differential amplifier 14 comprises a pair of transistors 15 and 16, wherein a terminal voltage of a capacitor 13 is applied to the base electrode of the transistor 15 and the output of a variable resistor 18 is applied to the base electrode of the transistor 16. The variable resistor 18 is connected in parallel with the diode 17. The diode 17 is provided to be responsive to the ambient temperature. Accordingly, the base electrode of the transistor 16 is supplied with a given reference voltage which is changeable incidental to a change of the ambient temperature and the base electrode of the transistor 15 is supplied with a voltage proportional to the battery voltage of the battery 1.

At the beginning of the charging operation, the battery voltage (V) of the battery 1 is small and accordingly the terminal voltage of the capacitor 13 is also small. Therefore, the collector voltage of the transistor 16 constituting the differential amplifier 14 is also low. Accordingly, the transistor 19 is rendered conductive and the gate electrode of the thyristor 6 is supplied with a given gate voltage, so that the thyristor 6 is turned on. Thereafter, as the charging time lapses, the battery voltage of the battery 1, i.e. the terminal voltage of the capacitor 13 rises. When the voltage at the base electrode of the transistor 15 becomes higher than the voltage at the base electrode of the transistor 16, the voltage at the collector electrode of the transistor 16 becomes high and the transistor becomes only slightly conductive. Accordingly, the gate electrode of the thyristor 6 will not be supplied with a gate voltage and thereafter no charging current flows in the battery 1. At that time, the voltage at the base electrode of the transistor 16, i.e. the reference voltage, changes in association with the ambient temperature by means of the diode 17. As a result, according to the FIG. 7 apparatus, a temperature compensating function depending on the ambient temperature is achieved. However, the FIG. 7 apparatus utilizes a change of a forward voltage drop across the diode 17 as a function of the ambient temperature for the purpose of changing the reference voltage (Vref) in association with the ambient temperature. The characteristic of the forward voltage drop of the diode with respect to the ambient temperature is rather linear. Therefore, the characteristic of the reference voltage (Vref) also becomes a linear one. On the other hand, the characteristic of the voltage at charge completion (Va) of the battery 1 with respect to the ambient temperature is a non-linear one, as shown by the curve III in FIG. 2 and the curve III in FIGS. 8A to 8C. Accordingly, the FIG. 7 apparatus also involves a problem to be described subsequently. More specifically, it can be considered that the reference voltage (Vref) can be set with respect to the voltage at charge completion (Va) in the manner as shown in FIGS. 8A, 8B or 8C. Usually the reference voltage (Vref) is set as shown in FIG. 8B. More specifically, since the characteristic of the voltage at charge completion (Va) is a non-linear one, while the characteristic of the reference voltage (Vref) is a linear one, it is impossible to match the characteristics of the reference voltage (Vref) with the characteristics of the voltage at charge completion (Va) throughout a necessary variation range of the ambient temperature. Accordingly, generally it is adapted such that both characteristics may be matched with each other in a middle temperature region which is normally considered as practical. On the other hand, alternatively it may be adapted such that both characteristics may be consistent in a lower temperature region as shown in FIG. 8A or in a higher temperature region as shown in FIG. 8C. In the case of FIG. 8A, the higher the ambient temperature (Tamb), the more non-conductive the transistor 19 (FIG. 7), and the earlier the timing when the thyristor 6 is turned off (the detection time of charge completion). Conversely, in the case of FIG. 8C, the detection time of charge completion is advanced in the lower temperature region. Accordingly, in either case where the apparatus is set as shown in FIG. 8A or as shown in FIG. 8C, undercharging is inevitable. Furthermore, in the case of FIG. 8B, since the characteristic of the voltage at charge completion (Va) and the characteristic of the reference voltage (Vref) were made consistent in the middle temperature region, this approach is somewhat reasonable in that optimum charging is achieved in the middle temperature region the charging of which is most frequent. However, the case of FIG. 8B involves a problem that complete charging can not be controlled in a lower temperature region or a higher temperature region.

On the other hand, of late there are trends toward utilization of rechargeable batteries as a power source even in motor driven machines consuming a relatively large electric power such as an electric drill, a lawn mower, and the like. Such rechargeable batteries as used in such motor driven machines need be capable of discharging a current larger than that of batteries used in smaller type machines such as electric shavers. Accordingly, such rechargeable batteries as used in such motor driven machines come to involve an increased frequency of charging operation and an increased number of batteries as compared with the batteries in small type machines. Therefore, such rechargeable batteries are often housed in a battery package structured to be separated from a main body of the machine, so that the battery package may be detachable from the main body of the machine. It has also been proposed that such battery package as such may be coupled to a charging apparatus separately provided, so that the batteries in the battery package may be charged independently of the main body of the machine. Considering employing such a battery package, the FIG. 7 apparatus further involves a more serious problem. As described previously, such rechargeable batteries used as a power source of a large sized motor driven machine are caused to be discharged with a higher discharge ratio (a discharge current/a battery current capacity). Usually, it is required that the batteries can be discharged at a high discharge ratio as high as say 3 C to 20 C. However, heat is generated in the batteries due to a discharge of such high discharge ratio and the battery temperature is accordingly increased. In addition, since dissipation of heat from the batteries has been blocked by the battery package, the temperature of the battery once increased is liable not to be decreased. Accordingly, a charge voltage can not be accurately controlled with the FIG. 7 apparatus.

More specifically, immediately after the discharge with a higher discharge ratio, the battery temperature is high as compared with the ambient temperature (Tamb) due to heat generated on the occasion of the discharge of the batteries itself. Accordingly, the voltage at charge completion (Va) of the batteries at that time has also been decreased, as shown in FIGS. 2 and 8A to 8C. However, even in such situation, the FIG. 7 apparatus controls a charging operation such that the voltage at charge completion (Va) may be dependent on the ambient temperature (Tamb) at that time. If the batteries are charged in such situation, it follows that the batteries are overcharged after all. The more the difference between the ambient temperature (Tamb) and the battery temperature, the more serious the above described problem. More specifically, in the case where the battery temperature is high, the difference between the actual voltage at charge completion (Va) and the reference voltage (Vref) as temperature compensated by the ambient temperature becomes large and a probability of causing overcharging is increased. Accordingly, in the case where a charging apparatus as shown in FIG. 7 is used, there was no way but to inhibit the charging, when the batteries are in a high temperature such as immediately after the batteries were discharged with a high discharge ratio.

SUMMARY OF THE INVENTION

In brief, the present invention comprises two temperature sensitive devices. One temperature sensitive device is provided to be sensitive to the battery temperature, while the other temperature sensitive device is provided to be sensitive to the ambient temperature, and a reference voltage for controlling the charging is provided to be responsive to both temperature sensitive devices. If and when the difference between the reference voltage and the battery voltage becomes smaller than a predetermined value, the charging of the battery is stopped.

According to the present invention, the reference voltage is adapted to be associated with both the battery temperature and the ambient temperature. Accordingly, the battery can be charged always under optimum conditions, irrespective of changes of the battery temperature and the ambient temperature, whereby a possibility of undercharging or overcharging is eliminated. Accordingly, undercharging will not be caused even in the case where the ambient temperature is low and overcharging will not be caused even in the case where the ambient temperature is high. Furthermore, even at the case where the battery in a high initial temperature is to be charged, such as the battery immediately after the same has been discharged with a high discharge ratio, a reference voltage adapted to the high battery temperature is generated and even in such a case overcharging will not be caused.

In a preferred embodiment of the present invention, the first temperature sensitive device responsive to the temperature of the rechargeable battery and the second temperature sensitive device responsive to the ambient temperature are provided. A current generating circuit is provided to generate a current which is changeable responsive to one of two devices, and a voltage generating circuit is provided to generate a voltage which is changeable responsive to the other of two devices and the current from the current generating circuit. A diode junction provided in the vicinity of the battery is used as the first temperature sensitive device. On the other hand, a resistive temperature sensitive device such as a thermistor is used as the second temperature sensitive device. A current or a voltage is changed as a function of the resistance of the resistive temperature sensitive device and a voltage or a current is changed as a function of the voltage across the diode junction. In a preferred embodiment of the present invention, optimum charge control can be always achieved with a relatively simple circuit configuration.

In another preferred embodiment of the present invention, means such as a resistive element for adjusting the characteristics of the generated current and/or voltage is provided. Accordingly, adjustment can be made with ease with respect to the diversity of the characteristics of electric circuit components such as a switching device for controlling a charging current. Furthermore, adaptation can be made with ease to a charge voltage characteristic having given rise to a time dependent change of the battery and different charge voltage characteristics of different kinds of batteries, by using such adjusting means.

Accordingly, a principal object of the present invention is to provide an improved charging apparatus which is always capable of controlling a charging operation in an assured manner.

Another object of the present invention is to provide a charging apparatus which is capable of controlling a charging operation as a function of both the battery temperature and the ambient temperature.

A further object of the present invention is to provide a charging apparatus having a relatively simple circuit configuration, which is capable of always controlling a charging operation in an assured manner.

Still a further object of the present invention is to provide a charging apparatus, wherein adjustment can be made with ease to the diversity of the characteristics of electric circuit components.

Still another object of the present invention is to provide a charging apparatus, which can be adapted with ease to a change of the characteristic of a battery being charged.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 1 to 3 are graphs showing various characteristics in the case where a typical Ni-Cd battery is charged, wherein the curve I in FIG. 1 shows one example of a change of the charge voltage (battery voltage) with respect to the charging time, the curve II shows an increase of the battery temperature with respect to the charge amount, the curve III of FIG. 2 shows the characteristic of the voltage at charge completion (Va) with respect to the ambient temperature, and the curve IV of FIG. 3 shows an increase of the battery temperature with respect to the ambient temperature;

FIG. 4 is a schematic diagram showing one example of a conventional charging apparatus of interest to the present invention;

FIGS. 5A, 5B, 6A and 6B are graphs for depicting the problems of the FIG. 4 charging apparatus, wherein FIGS. 5A and 5B show a case where the ambient temperature (Tamb) is high, FIGS. 6A and 6B show the case where the ambient temperature (Tamb) is low, the curves I and I' in FIGS. 5A and 6A show the characteristic of the battery voltage with respect to the time, the curves V and V' of FIGS. 5A and 6A show the increase of the battery temperature with respect to the time, the curves, VI and VI' of FIGS. 5B and 6B show the characteristic of the charging current (Ic) with respect to the time, and the curves VII and VII' of FIGS. 5B and 6B show the internal pressure (P) of the battery with respect to the time;

DESCRIPTION OF THE PREFERRED EMBODIMENTS

Figure 5A:
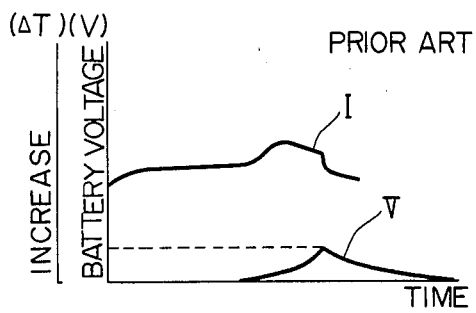
Figure 5B:
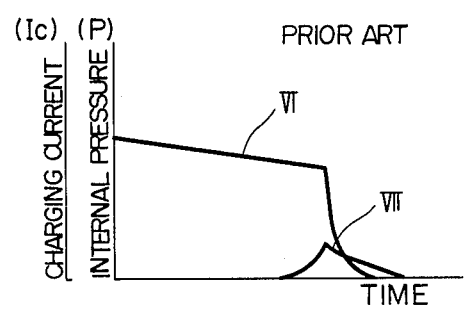
Figure 6A:
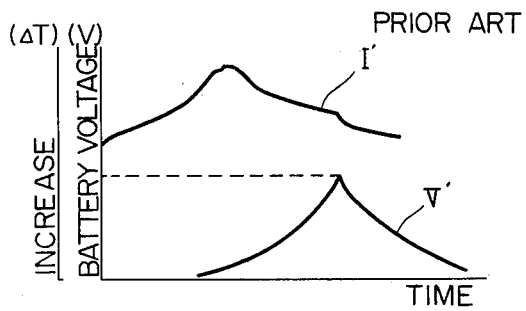
Figure 6B:
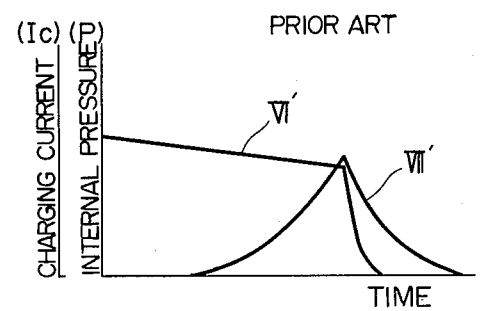
Figure 7:
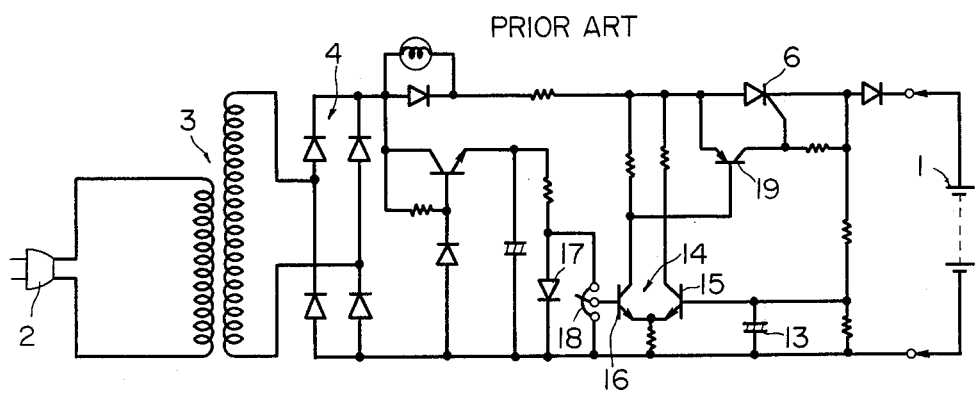
FIG. 7 is a schematic diagram of another example of a conventional charging apparatus of interest to the present invention.
Figure 8A:
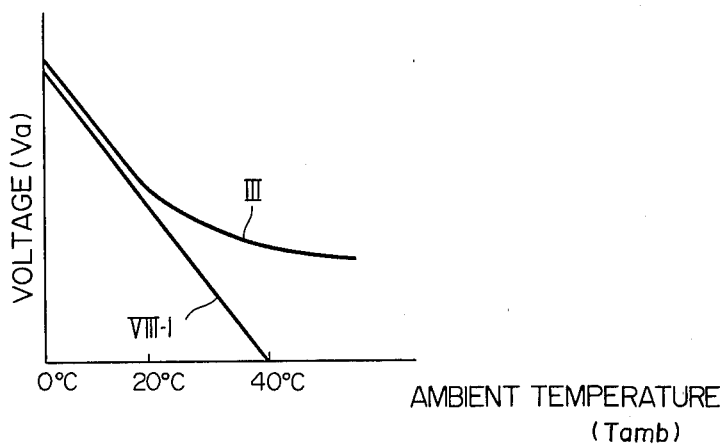
FIGS. 8A to 8C are graphs for depicting the problems of the FIG. 7 charging apparatus, wherein the curves III show the voltage (Va) at the charge completion with respect to the ambient temperature, and the curves VIII-1 to VIII-3 show the reference voltage (Vref) with respect to the ambient temperature.
Figure 8B:
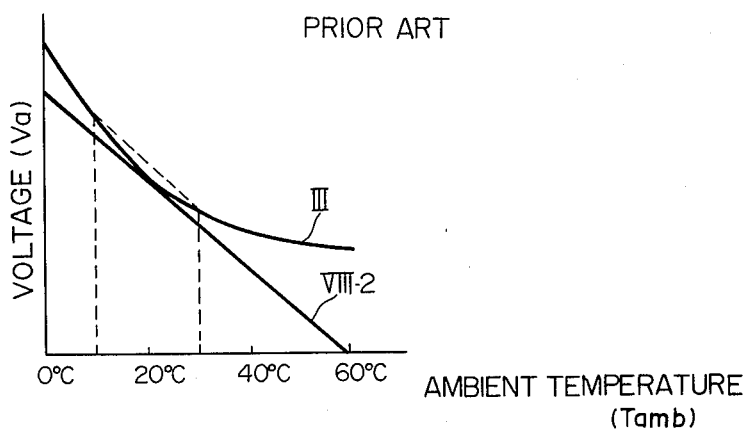
Figure 8C:
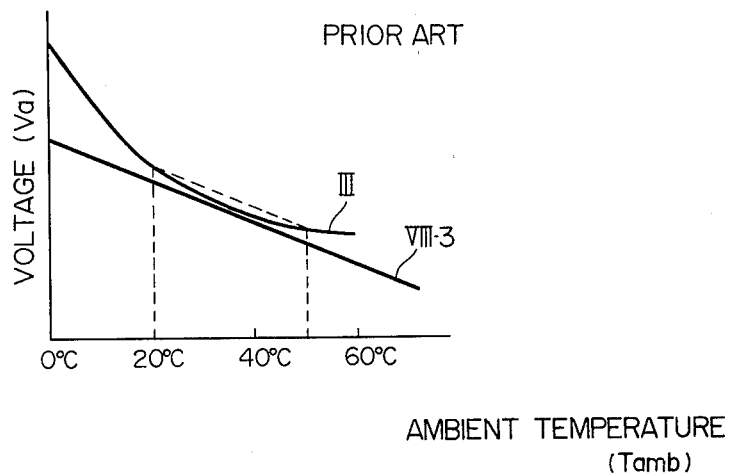
Figure 9:
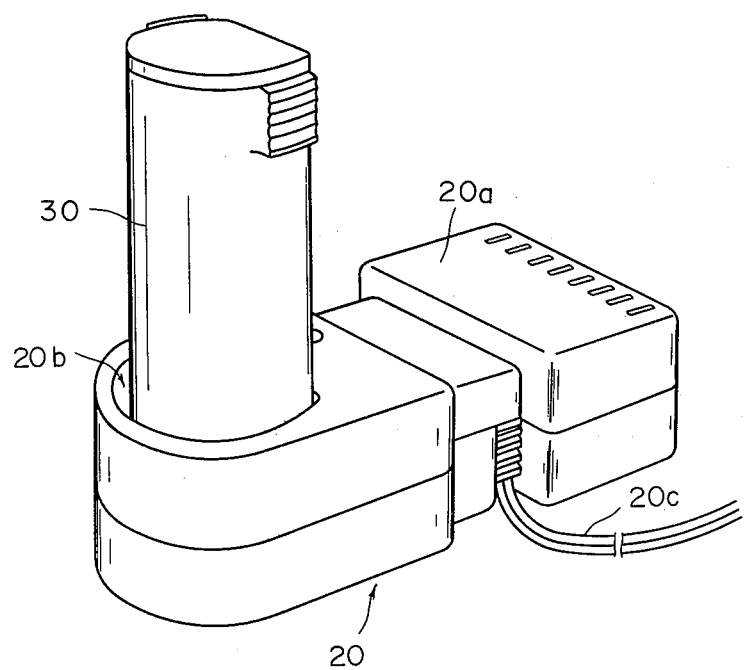
FIG. 9 is a perspective view showing one embodiment of the present invention.
Figure 10:
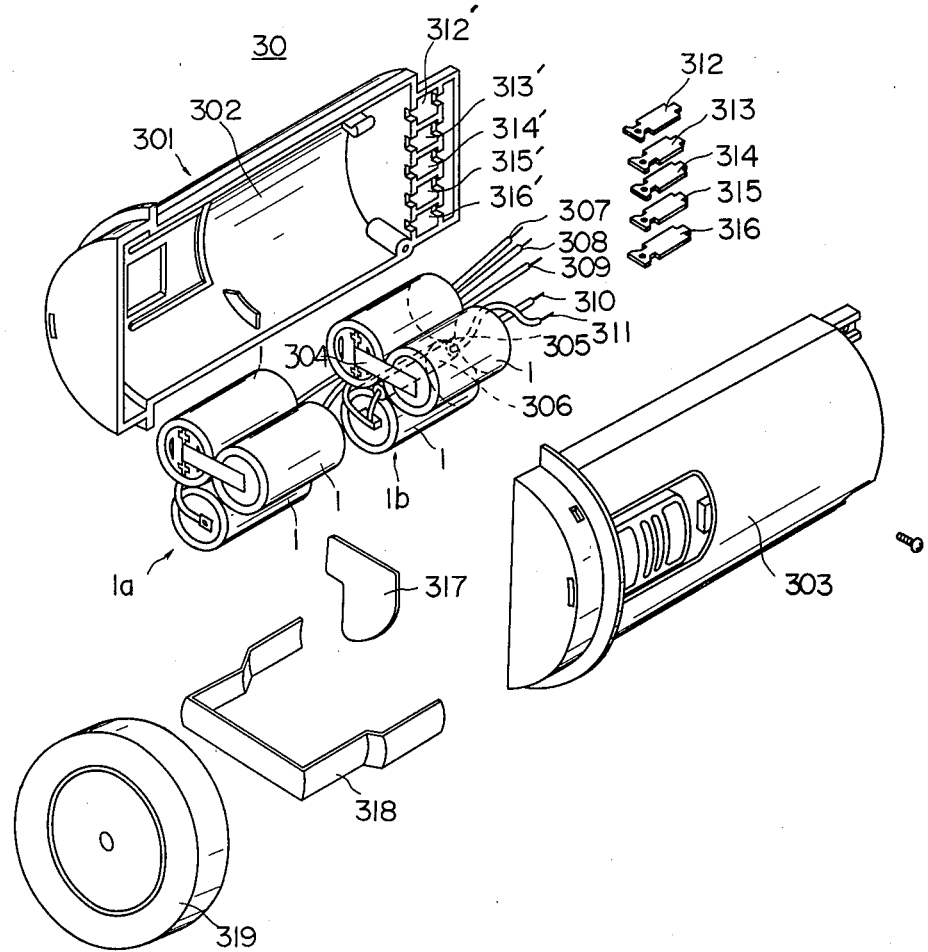
FIG. 10 is a perspective view of a disassembled state of a preferred example of a battery package.

FIG. 9 is a perspective view of one embodiment of the present invention. FIG. 10 is a perspective view of a disassembled state of one example of the battery package. First referring to FIGS. 9 and 10, the charging apparatus 20 and the battery package 30 of the embodiment will be briefly described. The charging apparatus 20 comprises an electric circuit portion to be described subsequently housed in a housing 20a made of plastic, for example. The housing 20a is formed with a concavity 20b for mounting the battery 30. Although not shown, the concavity 20b is provided with connection terminals for connection to predetermined ones of terminals of the battery package 30 to be described subsequently. A cord 20c having a plug 2 at the end thereof is led out from the charging apparatus 20. The battery package 30 comprises a housing 301. The housing 301 comprises half shells 302 and 303, which are united to house batteries 1, 1, .... Every three batteries 1, 1, 1 are bundled as a block so that the centers of the batteries constitute an equilateral triangle. In the embodiment shown, six batteries 1, 1, ... are bundled in two blocks 1a and 1b, each including three batteries. A space 305 is formed among the three batteries 1 forming the battery block 1b and an insulating tube 306 is inserted in the space 305. As better shown in FIG. 11, a series connection of two diodes 241 and 242 and a resistor 243 is inserted in the insulating tube 306. Accordingly, these diodes 241 and 242 are susceptible to the battery temperature of these three batteries forming the battery block 1b, so that an average battery temperature of these batteries may be detected. The three batteries forming each of the battery blocks 1a and 1b are series connected by means of connection plates 304. On the other hand, terminal holding portions 312', 313', 314', 315 and 316' are formed in the housing 301 and terminals 312, 313, 314, 315 and 316 are held by the respective terminal holding portions. These terminals 312 to 316 are connected to the corresponding connection leads 307 to 311, at one end of each of them. The connection lead 307 is connected to the plus terminal of one battery forming the battery block 1a, for example, the connection lead 308 is connected to the minus terminal of one battery 1 forming the battery block 1a, the connection lead 309 is connected to the plus terminal of one terminal 1 forming the battery block 1b and the connection lead 310 is connected to the minus terminal of the other one battery forming the battery block 1b. The connection lead 310 is connected to the resistor 243 housed in the insulating tube 306. The cathode of the diode 241 inserted in the insulating tube 306 is connected to the minus terminal of the other one battery 1 forming the battery block 1b. Thus, the respective blocks 1a and 1b and the temperature sensitive devices of the diodes 241 and 242 (and the resitor 243) are connected to the terminals 312 to 316 by means of the connection lead 307 to 311, while the same are housed in the housing 301. In such case an insulating plate 317 and a holding spring 318 are used and a cap 319 is commonly covered to one end of each of the two half shells 302 and 303. Thus, the batteries and the diodes 241 and 242 which are sensitive to the temperature of these batteries are unitedly housed in the battery package 30. The battery package 30 is mounted to the concavity 20b of the charging apparatus 20 as shown in FIG. 9 so that the charging apparatus of a circuit configuration as shown in FIG. 12 and thus in FIG. 13 may be structured.

Figure 11:
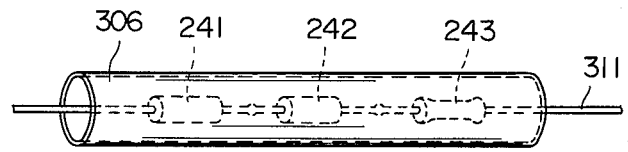
FIG. 11 is a view showing one example of a diode being inserted in the space defined among the batteries.
Figure 12:
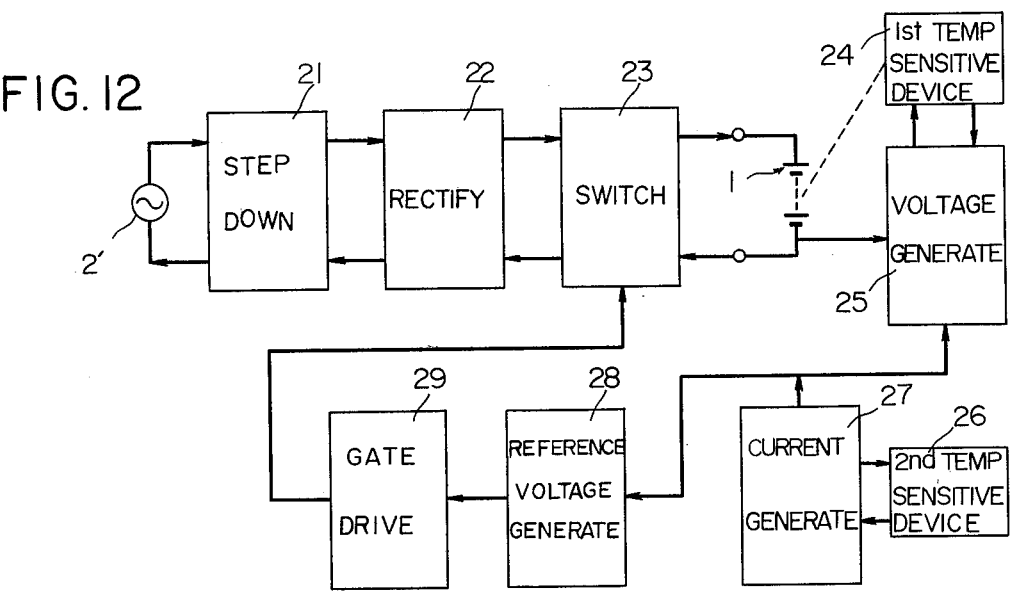
FIG. 12 is a block diagram showing one embodiment of the present invention.

FIG. 12 is a block diagram showing one embodiment of the present invention. The block diagram shown implements the previously described charging apparatus 20 shown in FIG. 9. An alternating current supplied from an alternating current voltage source 2' such as a commercial power supply is stepped down by a step down circuit 21 including a transformer, for example, and the output thereof is applied to a rectifying circuit 22. The alternating current supplied thereto is half-wave rectified or full-wave rectified by means of the rectifying circuit 22 and the rectified output is applied through a switching circuit 23 including a switching element such as a thyristor, for example, to the batteries 1 as a charging current. On the other hand, a first temperature sensitive element 24 such as the one described in conjunction with FIG. 11 is thermally coupled to the batteries 1. The first temperature sensitive device 24 is connected to a voltage generating circuit 25. Accordingly, the voltage generating circuit 25 provides an output voltage which is linearly changeable as a function of the temperature of the batteries 1. On the other hand, a second temperature sensitive device 26 is provided inside or outside the housing 20a shown in FIG. 9 so as to be sensitive to the ambient temperature. The second temperature sensitive device 26 comprises a resistive temperature sensitive device such as thermistor, for example, which exhibits a resistance changeable in a non-linear manner as a function of the ambient temperature. The second temperature sensitive device 26 is connected to a current generating circuit 27. Accordingly, the current generating circuit provides a current which is changeable in a non-linear manner as a function of the ambient temperature. The current provided by the current generating circuit 27 is applied to the above described voltage generating circuit 25. Accordingly, the voltage generating circuit 25 provides an output voltage which is changeable following the ambient temperature and at the same time provides an output voltage which has been temperature compensated based on the battery temperature and such output voltage is applied to a reference voltage generating circuit 28. The reference voltage generating circuit 28 comprises a direct current amplifier, for example, so that the same is responsive to the output voltage of the voltage generating circuit 25 to provide a reference voltage for controlling a charging operation of the battery 1. Since the output voltage obtained from the voltage generating circuit 25 has been compensated for both the ambient temperature (Tamb) and the battery temperature (Tb) as described above, the reference voltage obtained from the reference voltage generating circuit 28 has also been compensated in the same manner. More specifically, the manner of a change of the reference voltage obtained from the reference voltage generating circuit 28 is adapted to the non-linearity characteristic (FIG. 2) of the voltage at charge completion (Va) associated with the change of the ambient temperature and in a state of the battery 1 being in a high temperature the reference voltage is further changed in a linear manner. Accordingly, it follows that when the voltage at charge completion (Va) of the batteries 1 is influenced by the ambient temperature and the battery temperature (Tb), a reference voltage changeable following the change of the voltage at charge completion (Va) is generated. The reference voltage obtained from the reference voltage generating circuit 28 is applied to the switching circuit 23 through a gate drive circuit 29. More specifically, the switching circuit 23 comprises a thyristor, for example, which is connected such that the thyristor is turned off if and when the difference between the reference voltage obtained from the reference voltage generating circuit 28 and thus the voltage obtained from the gate drive circuit 29 and the battery voltage of the batteries 1 becomes smaller than the switching voltage of the thyristor, not shown. Accordingly, the charging current will not be supplied from the rectifying circuit 22 to the batteries 1, after the thyristor is turned off.

Figure 13:
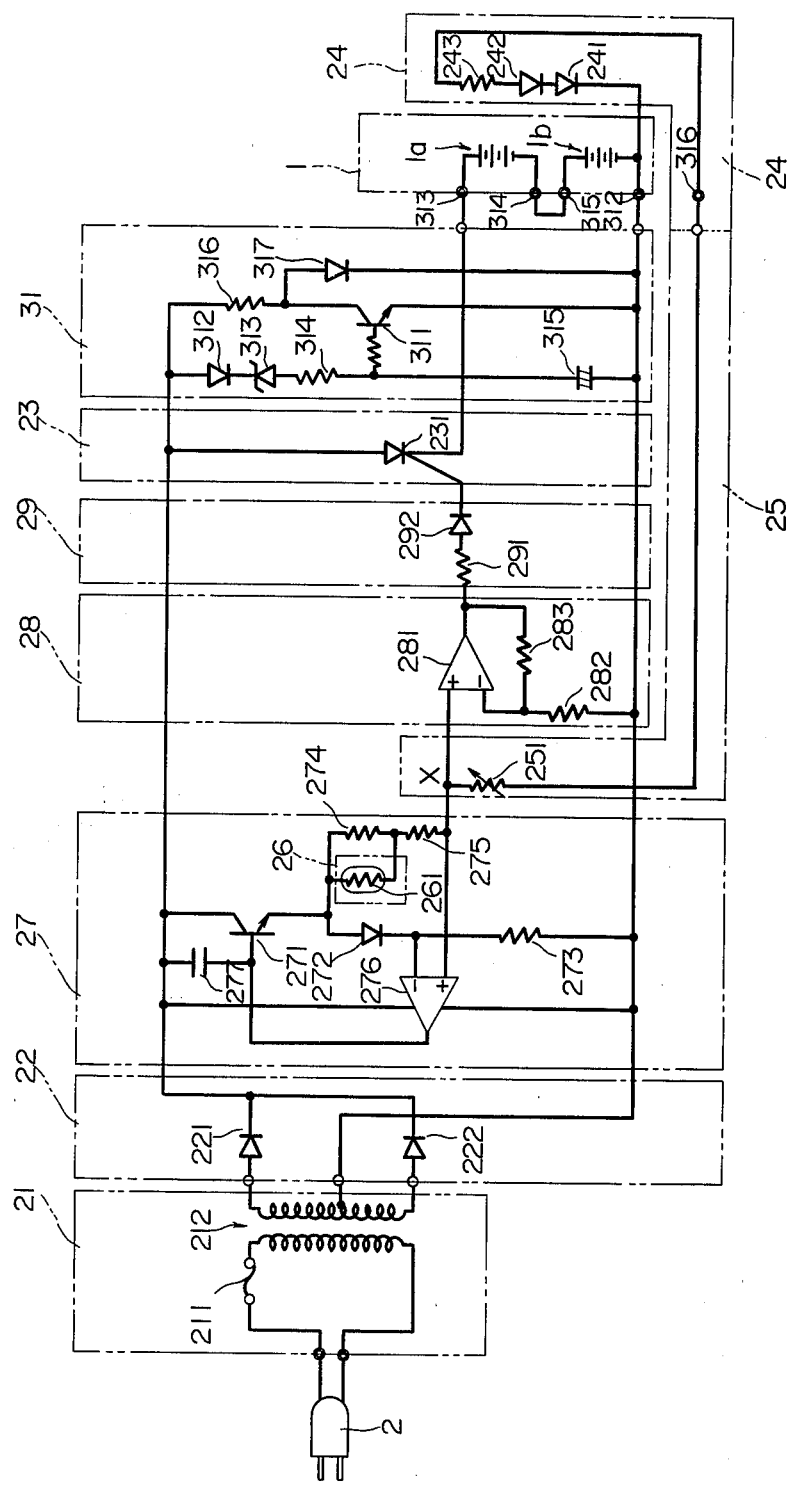
FIG. 13 is a schematic diagram showing a preferred example of the FIG. 12 embodiment.

FIG. 13 is a schematic diagram of the FIG. 12 embodiment and thus of a preferred embodiment of the present invention. Referring to FIG. 13, the commercial power supply is received by the plug 2 and is applied to the step down circuit 21. The step down circuit 21 comprises a fuse 211 and a transformer 212 and the output winding of the transformer 212 is connected to rectifying diodes 221 and 222 constituting the rectifying circuit 22. The center tap of the output winding of the transformer 212 is connected to the ground level. The rectifying circuit 22 comprises a full-wave rectifying circuit implemented by the two diodes 221 and 222. A series connection of the thyristor 231 constituting the switching circuit 23 and the batteries 1 is connected to the full-wave rectifying circuit 22.

The current generating circuit 27 comprises the second temperature sensitive device 26, i.e. the thermistor 261. The circuit 27 further comprises a transistor 271 serving as a variable impedance element. The emitter electrode of the transistor 271 is connected through a diode 272 and a resistor 273 to the ground level and further through a series connection of a resistor 275 and a parallel connection of a thermistor 261 and a resistor 274 to a junction X. The junction X is connected to one input (+) of an operational amplifier 276. The other input (−) of the operational amplifier 276 is connected to the junction of the series connection of the diode 272 and the resistor 273. The output of the operational amplifier 276 is connected to the base electrode of the transistor 271. The resistor 273 serves as a biasing resistor of the diode 272 and the capacitor 277 serves to prevent parasitic oscillation of the operational amplifier 276. The current generating circuit 27 provides a current changeable following the temperature characteristic of the thermistor 261 to the junction X. More specifically, the operational amplifier 276 makes control such that the voltage drop caused by the current flowing through the series connection of the resistor 275 and the parallel circuit of the thermistor 261 and the resistor 274 may be equal to the voltage drop across the diode 272. More specifically, the operational amplifier 276 provides a high voltage when one input (+) is smaller than the other input (−) and in such a case the transistor 271 is rendered more conductive and a larger current flows through the above described series connection. Conversely, when one input (+) is larger than the other input (−), the impedance of the transistor 271 becomes larger and the current flowing through the above described series connection becomes smaller. Accordingly, it follows that the current flowing in the junction X is changeable depending on the resistance value of the thermistor 261 and thus depending on the ambient temperature (Tamb).

The junction X is further connected to one terminal of a variable resistor 251 included in the voltage generating circuit 25 and the other terminal of the variable resistor 251 is connected through the first temperature sensitive device 24 to the ground level. The first temperature device 24 comprises the series connection of the diodes 241 and 242 and the resistor 243 and, as previously described in conjunction with FIG. 9, these diodes 241 and 242 and the resistor 243 are thermally coupled to the batteries 1. The junction X is further connected to one input (+) of an operational amplifier 281 constituting the reference voltage generating circuit 28. The other input (−) of the operational amplifier 281 is connected through a resistor 282 to the ground level and is also connected through a resistor 283 to the output. The output voltage of the operational amplifier 281 is supplied as the reference voltage (Vref) through the gate drive circuit 29 to the gate electrode of the thyristor 231. The gate drive circuit 29 comprises a series connection of a resistor 291 and a diode 292. The diode 292 mainly functions to block a discharging current of the batteries 1 from flowing from the cathode to the gate of the thyristor 231.

The embodiment shown further comprises a charge display circuit 31. The charge display circuit 31 comprises a light emitting diode 317, so that the charging operation or the charge completion is displayed by an on or off state of the light emitting diode 317. The light emitting diode 317 is connected between the collector electrode of the transistor 313 and the ground level and the collector electrode of the transistor 311 is connected through a resistor 316 to the output of the rectifying circuit 22. A series connection is formed with a diode 312, a zener diode 313, a resistor 314 and a capacitor 315, and the junction of the resistor 314 and the capacitor 315 is connected through a resistor to the base electrode of the transistor 311. The operation of the charge display circuit 31 will be described subsequently.

Now selection of the various constants of the FIG. 13 diagram will be described in detail. The junction of the current generating circuit 27 and the voltage generating circuit 25 is assumed to be X and a current flowing in the voltage generating circuit 25 through the junction X at a given temperature $T_o$ is assumed to be $i_2$. Then the current $i_2$ may be expressed by the following equation;

$$i_2 = V_{DS}/R_S$$

where $R_S$ is a composite resistance of the thermistor 261 and the resistors 274 and 275 and is expressed by the following equation:

$$R_S = \frac{R_{th} \cdot R_1}{R_{th} + R_1} + R_2$$

where $R_1$ is a resistance value of the resistor 274, $R_2$ is a resistance value of the resistor 275 and $R_{th}$ is a resistance value of the thermister 261. The resistance $R_{th}$ of the thermister 261 may be expressed by the following equation:

$$R_{th} = R_{25} \exp\left[B\left(\frac{1}{T_o} - \frac{1}{273}\right)\right]$$

where $R_{25}$ is a resistance value of the thermistor 261 at the temperature of 25° C., which is an inherent value of the thermistor 261, B is a constant representing the temperature characteristic of the thermistor 261 wherein the larger the constant the larger the gradient of a resistance variation depending on the temperature. Furthermore, $V_{DS}$ denotes a forward voltage drop across the diode 272, which is expressed by the following equation:

$$V_{DS} = \frac{kT}{q} \ln\left(\frac{i_1}{i_0} + 1\right)$$

where k is a Boltzmann's constant, q is an electric charge quantity flowing through the diode 272, $i_0$ is a reverse current inherent to the diode (the diode constant), and $i_1$ denotes a forward current flowing through the diodes 272 at that time.

As seen from the above described equations, by properly selecting the resistance values of the thermistor 261 and the resistors 274 and 275, a current $i_2$ having an arbitrary non-linearity characteristic is obtained at the junction X. Such current $i_2$ is applied to the voltage generating circuit 25. Then the voltage at the junction X, i.e. the output voltage Vx of the voltage generating circuit 25 may be expressed by the following equation (1):

$$Vx = Rx \cdot i_2 + 2\left[\frac{kT}{q} \ln\left(\frac{i_2}{i_0} + 1\right)\right] \quad (1)$$

$$= Rx \cdot i_2 + 2V_{DF}(i_2)$$

Meanwhile, in the above described equation, Rx denotes the sum of the resistance values of the variable resistor 251 and the resistor 243, and $V_{DF}$ denotes a forward voltage drop of each of the diodes 241 and 242.

On the other hand, assuming that the output voltage of the reference voltage generating circuit 28 be Vref, the output voltage (Vref) may be expressed by the following equation:

$$Vref = \left(1 + \frac{R_3}{R_4}\right) \cdot Vx \quad (2)$$

where $R_3$ denotes a resistance value of the resistor 283 and $R_4$ denotes a resistance value of the resistor 282. Furthermore, assuming that a current flowing through the resistor 291 of the gate drive circuit 29 and the diode 292 is $i_G$, the current when the thyristor 231 is turned on is $i_{GT}$ and the gate voltage at that time is $V_{GT}$, then the voltage condition when the thyristor 231 is turned on may be expressed by the following equation (3):

$$Vref = R_5 \cdot i_{GT} + V_{DG}(i_{GT}) + V_{GT} + V \quad (3)$$

In the above described equation (3), $R_5$ denotes a resistance value of the resistor 291, V denotes a voltage of the batteries 1, and $V_{DG}$ denotes a forward voltage drop across the diode 292, which may be expressed by the following equation:

$$V_{DG} = \frac{kT}{q} \ln\left(\frac{i_{GT}}{T_o} + 1\right)$$

By substituting the above described equation (2) in the above described equation (3), the battery voltage (V) may be expressed by the following equation:

$$V = \left(1 + \frac{R_3}{R_4}\right) V_x - [R_5 \cdot i_{GT} + V_{DG}(i_{GT}) + V_{GT}]$$

Accordingly, assuming the voltage at charge completion of the batteries 1 to be (Va), the voltage Vx at the junction X is selected to satisfy the following equation:

$$V_x = \frac{V_a + [R_5 \cdot i_{GT} + V_{DG}(i_{GT}) + V_{GT}]}{1 + \frac{R_3}{R_4}}$$

Therefore, the characteristic of the thermistor 261 and the resistance values of the resistors 274 and 275 are determined so that the current $i_2$ of the above described equation (1) may be provided so as to attain the above described voltage Vx. As described in the foregoing, the condition formula of the voltage Vx for controlling a charging current in a desired manner is obtained. Thus such selection should be preferably be made so that the above described condition formula is always established in a desired variation range of the ambient temperature, such as 0° C. to 80° C., for example. More specifically, the circuit is preferably designed such that the temperature characteristic of the respective voltages Vref, $R_5 \cdot i_{GT}$, $V_{DG}(i_{GT})$, $V_{GT}$ and Va with respect to the temperature variation may satisfy the relation of the following equation (4):

$$\frac{\Delta V_{ref}}{\Delta T_{amb}} = \frac{\Delta V_a}{\Delta V_b} - \frac{\Delta V_{GT}}{\Delta T_t} + R_5 \cdot \frac{\Delta i_{GT}}{\Delta T_t} + \frac{\Delta V_{DG}}{\Delta T_d} \quad (4)$$

The left side ($\Delta V_{ref}/\Delta T_{amb}$) of the above described equation (4) denotes a temperature gradient of the output voltage of the operational amplifier 281 with respect to the ambient temperature (Tamb), the first term ($\Delta V_a/\Delta T_b$) of the right side denotes a temperature gradient of the voltage at charge completion (Va) of the battery 1 with respect to the battery temperature (Tb), the second term ($\Delta V_{GT}/\Delta T_{th}$) of the right side denotes a temperature gradient of the gate voltage when the thyristor 231 is turned on with respect to the thyristor temperature (Tth), the third term $$\left(R_5 \cdot \frac{\Delta i_{GT}}{\Delta T_{th}}\right)$$

of the right side denotes, by the portion excluding R5, a temperature gradient of the gate current when the thyristor 231 is turned on with respect to the thyristor temperature (Tth), and the fourth term ($\Delta V_{DG}/\Delta T_d$) of the right side denotes a temperature gradient of the forward voltage drop across the diode 292 with respect to the diode temperature (Td). Referring to the above described equation (4), the respective terms of the right side are determined by the inherent characteristics of the batteries 1, the thyristor 231, the thyristor 231 and the diode 292. Accordingly, in order to always satisfy the above described equation (4), the output voltage of the operational amplifier 281, i.e. the reference voltage (Vref) need be changed to exhibit a non-linearity characteristic in accordance with the ambient temperature (Tamb). The variable resistor 251 included in the voltage generating circuit 25 and the resistor 243 included in the first temperature sensitive device 25 constitute means for adjusting the variation characteristics of the voltage Vx. More specifically, the resistor 243 is provided for the purpose of adjusting the diversity of the forward voltage drop across the diode 241 and 242 and, when the diodes 241 and 242 are provided by selecting those having predetermined characteristics, the resistance value of the resistor 243 is selected to be a proper value, so that the diversity of the output voltage Vx of the voltage generating circuit 25 may be limited to the minimum. On the other hand, the variable resistor 251 serves as a trimmer and, by properly adjusting the variable resistor 251, ultimately the diversities of $V_{GT}$, $i_{GT}$ and $V_{DG}$ can be adjusted.

Figure 14:
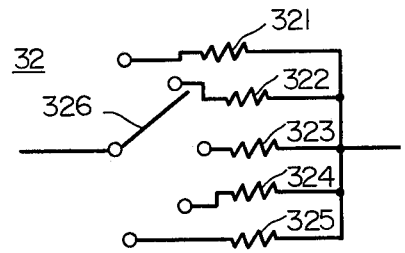
FIG. 14 is a schematic diagram of a major portion of one example of a characteristic adjusting means.

In place of these variable resistors 251 and 243, or in series with these variable resistors 251 and 243, a resistor circuit 32 as shown in FIG. 14 may be used. The resistor circuit 32 comprises five resistors 321 to 325 provided in parallel and a switch 326 for selecting any one of these five resistors 321 to 325. A selecting operation knob of the switch 326 is provided externally of the charging apparatus 20 (FIG. 9) so as to be manually selectable. By properly selecting the switch 326, prompt adaptation to a time dependent change of the batteries and an exchange of the batteries can be made. By utilizing the resistor circuit 32 in place of the resistor 243 or simultaneously with the resistor 243, the non-linearity characteristic itself of the current flowing from the current generating circuit 27 to the voltage generating circuit 25 can be considerably changed. Accordingly, simple adaptation can be made even to batteries of different kinds having a different characteristic of the voltage at charge completion (Va), by properly selecting the switch 326. Accordingly, the resistor circuit 32 is particularly advatageous when batteries are exchanged with those of a different manufacturer.

Figure 15:
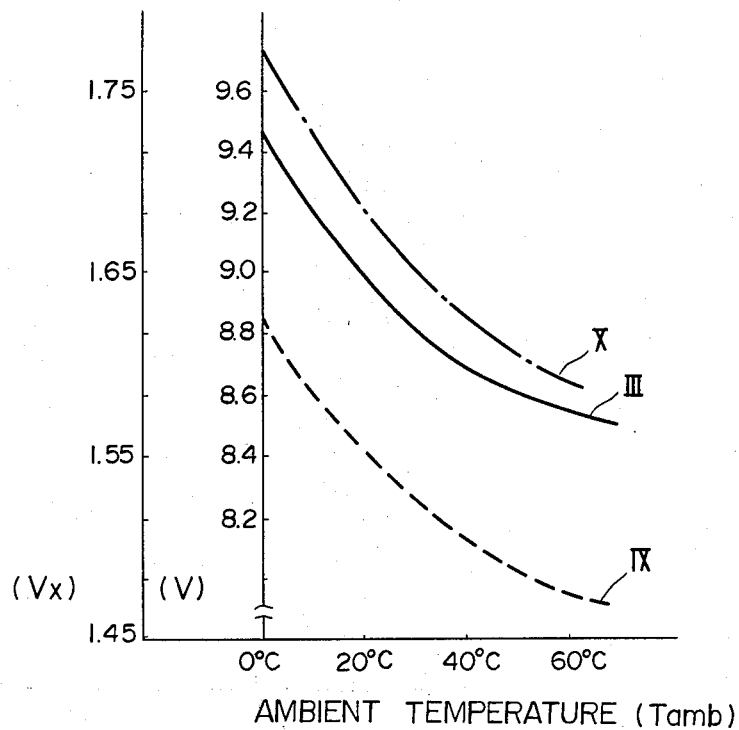
FIG. 15 is a graph for depicting the embodiment shown in FIGS. 12 and 13, wherein the curve III shows the voltage at charge completion (Va) with respect to the ambient temperature, the curve IX shows the generated voltage (Vx) with respect to the ambient temperature, and the curve X shows the reference voltage (Vref) with respect to the ambient temperature.

FIG. 15 is a graphs showing a variation characteristic of the respective voltages Vx, Vref and Va with respect to the ambient temperature (Tamb) in the case where the FIG. 13 embodiment is designed to satisfy the above described equation (4). The graph was drafted based on the actual data in the case where the batteries 1 are of a Ni-Cd type and six batteries each having a battery capacity of 1200 mA. Hr are connected in series and charged simultaneously. Referring to FIG. 15, the curve III shows a variation characteristic of the voltage (V) at the charge completion of the batteries 1, the curve IV shows a variation characteristic of the voltage (Vx) at the junction X, and the curve X shows a variation characteristic of the output voltage of the operational amplifier 281, i.e. the reference voltage (Vref).

Referring to FIG. 15, the ratio of the reference voltage (Vref) to the voltage (Vx) at the junction X becomes $$\frac{V_{ref}}{V_x} = \left(1 + \frac{R_3}{R_4}\right).$$

Furthermore, the difference between the reference voltage (Vref) and the voltage at charge completion (Va) of the battery 1 becomes $R_5 \cdot i_{GT} + V_{GT} + V_{DG}(i_{GT})$.

Figure 16A:
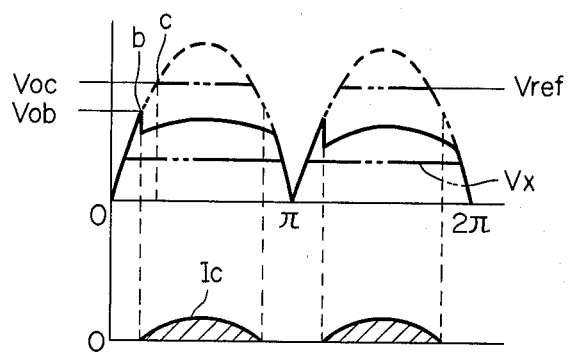
FIGS. 16A to 16C are waveforms for explaining the operation of the embodiment shown in FIGS. 12 and 13.
Figure 16B:
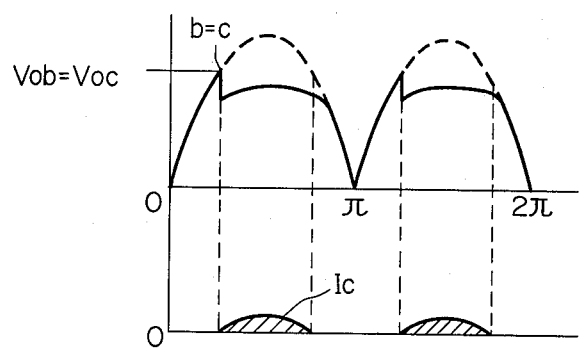
Figure 16C:
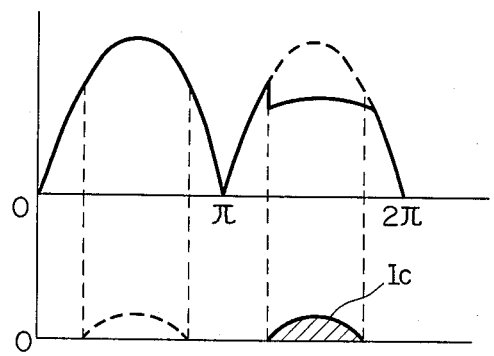

FIGS. 16A to 16C are waveforms for explaining the operation of the FIG. 13 embodiment. More specifically, FIG. 16A shows a case at the beginning of a charging operation of the batteries 1, FIG. 16B shows a chase at the end of the charging operation, and FIG. 16C shows a case where the voltage of the batteries 1 has reached the charge associated voltage. Now referring to FIGS. 16A to 16C, the operation of the FIG. 13 embodiment will be described.

At the beginning of a charging operation, the battery voltage (V) of the batteries 1 is naturally smaller than the voltage at charge completion (Va) and accordingly, the voltage (Vob) at the b point shown in FIG. 16A is smaller than the voltage (Voc) at the c point. It is pointed out that $Vob = Vb + R5 \cdot i_{GT} + V_{GT} + V_{DG}(i_{GT})$, and $Voc = Va + R5 \cdot i_{GT} + V_{GT} + V_{DG}(i_{GT})$. At the beginning of a charging operation shown in FIG. 16A, the thyristor 231 is turned on at the b point and accordingly thereafter a charging current Ic flows from the rectifying circuit 22 through the thyristor 231 to the batteries 1. Since the charging current (Ic) flows, a voltage drop is caused by the internal impedance of the step down circuit 21 and accordingly the output voltage of the rectifying circuit 22 becomes lower than that when the thyristor 231 was turned on by the battery voltage (V) and the forward voltage drop (Vscr) of the thyristor 231, as shown in FIG. 16A. Meanwhile, since neither the ambient temperature (Tamb) nor the battery temperature (Tb) changes at the beginning of the charging operation, the voltage (Vx) at the junction X becomes as shown by the two dotted line in FIG. 16A. Referring to FIG. 16A, the waveform shown by the dotted line shows the output voltage of the rectifying circuit 22 is in a non-load state, i. e. the thyristor 231 is turned off. Thus, the charging current (Ic) flows in the batteries 1 for each half cycle of the alternating current.

Thereafter, as the charging operation progresses, the battery voltage (V) increases. Then, as shown in FIG. 16B, the condition of $Vob \approx Voc$ is established and the thyristor 231 becomes a state of being about to be turned off. Even in such condition of $Vob \approx Voc$, the charging current (Ic) flows into the batteries 1 for each half cycle. However, the charging current at that time has become much smaller as compared with the charging current previously shown in FIG. 16A.

When the state changes from the FIG. 16B state to that of $Vob > Voc$, the thyristor 231 is turned off. Accordingly, n charging current flows into the batteries 1 in the first half cycle of FIG. 16C. In the following half cycle, the voltage of the batteries 1 slightly decreases and again the condition of FIG. 16B is established and the charging current (Ic) flows. Thereafter, as the charging operation progresses, the ratio of a non-flowing half cycle to a flowing half cycle where the charing current (Ic) flows increases and as a result an average charging current decreases. Thus, the charging operation of the batteries 1 is effected.

Meanwhile, the display control circuit 31 comprises the zener diode 313. The zener diode 313 is aimed to detect a drop of the output voltage of the rectifying circuit 22, which considerably drops when the charging current flows into the batteries 1. More specifically, when the output voltage of the rectifying circuit 22 considerably drops, the transistor 311 is rendered non-conductive and accordingly a current flows in the light-emitting diode 317, whereby the light-emitting diode 317 indicates that the charging operation is going on. Conversely, unless the charging current flows into the batteries 1, the transistor 311 remains conductive and accordingly no current flows in the light-emitting diode 317. Accordingly, the light-emitting diode 317 of the charge display circuit 31 looks as continuously lighted, in the case of the FIG. 16A and FIG. 16B states, whereby it is confirmed that the charging operation is going on. After the FIG. 16C state, the ratio of the off period to the on period of the light emitting diode gradually increases and as a result a blinking indication is made, and it is confirmed that the charging operation is completed.

As described in the foregoing, the embodiment is adapted such that the temperature gradient of the reference voltage (Vref) is set to be dependent on the above described equation (4) and the reference voltage (Vref) may be changeable following the temperature dependent change of the voltage at charge completion (Va). Accordingly, various modifications of the FIG. 13 embodiment may be considered, insofar as the above described equation (4) is satisfied.

FIGS. 17 to 21 are schematic diagrams of major portions of different modifications of the FIG. 13 embodiment. In the following, such modifications will be briefly described.

Figure 17:
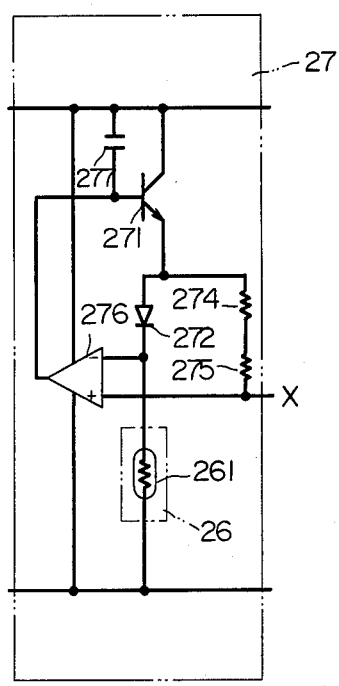
FIGS. 17 to 21 are schematic diagrams of major portions of modified examples of the FIG. 13 embodiment.

Referring to FIG. 17, as the biasing resistor of the diode 272, a second temperature sensitive device 26, i.e. a thermistor 261 it utilized. In such case, the thermistor connected in parallel with the resistor 274 is removed. According to the FIG. 17 embodiment, one input (−) of the operational amplifier 276 changes depending on the temperature characteristic of the thermistor 261 and as a result a current flowing through the resistors 274 and 275 into the junction X is also dependent on the temperature characteristic of the thermistor 261.

Figure 18:
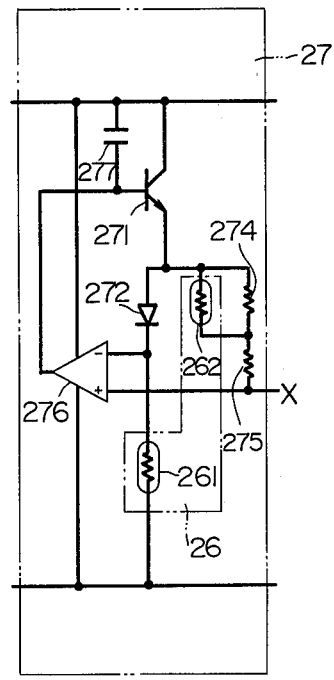

FIG. 18 is another modification of the FIG. 17 embodiment. FIG. 18 embodiment employs a thermistor 261 as the biasing resistor of the diode 272 and further employs a thermistor 262 as the resistor 274. The thermistor 262 is also formed as a second temperature sensitive device so as to exhibit a resistance value associated with the ambient temperature. In the FIG. 18 embodiment, the thermistor 262 merely serves to make temperature compensation of the forward voltage drop (Vds) of the diode 272. Even in the case of the FIG. 18 embodiment, a current flowing into the junction X changes depending on the ambient temperature (Tamb).

Figure 19:
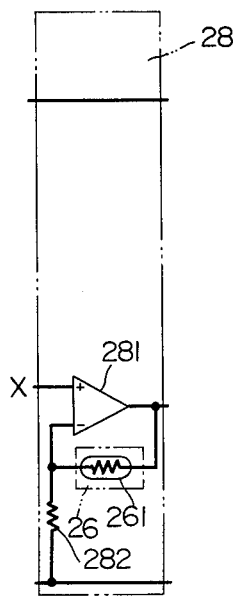
Figure 20:
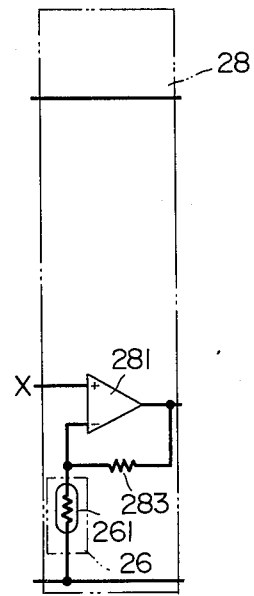
Figure 21:
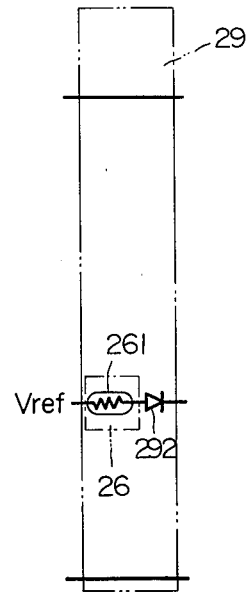

FIG. 19 and et seq FIGS. 20 and 21 shows embodiments in which the current generating circuit 27 need not have the ambient temperature dependent characteristic, although the embodiment shown in FIGS. 13, 17 and 18 were adapted such that the current obtained from the current generating circuit 27 may be changed so that the voltage (Vx) and thus the reference voltage (Vref) may be changed depending on the ambient temperature (Tamb). Accordingly, in the case of the embodiment shown in FIGS. 19 to 21, the thermistor included in the current generating circuit 27 is not necessary and the current generating circuit 27 may be structured as a mere constant current source. In the case of the FIG. 19 embodiment, a second temperature sensitive device 26, i.e. a thermistor 261 is used in the reference voltage generating circuit 28 receiving the output voltage (Vx) of the voltage generating circuit 25. The FIG. 19 embodiment is of a case where the thermistor 261 is substituted for the resistor 283 of the FIG. 13 embodiment and the FIG. 20 embodiment is of a case where the thermistor 261 is substituted for the resistor 282. As shown in FIGS. 19 and 20, even by including the thermistor 261 in the reference voltage generating circuit 28, the reference voltage (Vref) can be made chageable depending on the ambient temperature.

FIG. 21 shows still another example, in which the thermistor 261 is substituted for the resistor 291 (FIG. 13) of the gate drive circuit 29. Even by employing the thermistor 261 in the gate drive circuit 29, the gate voltage being applied to the thyristor 231 can be made changeable depending on the ambient temperature and by properly selecting the characteristic of the above described thermistor 261, the above described equation (4) can be satisfied. Meanwhile, in the case of the FIG. 21 embodiment, the constant B representing the temperature gradient characteristic of the thermistor 261 may be a smaller one as compared with a case of the other embodiments.

Meanwhile, those other portions not described in the embodiments shown in FIGS. 17 to 21 may be sustantially the same as those in the FIG. 13 embodiment.

Figure 22:
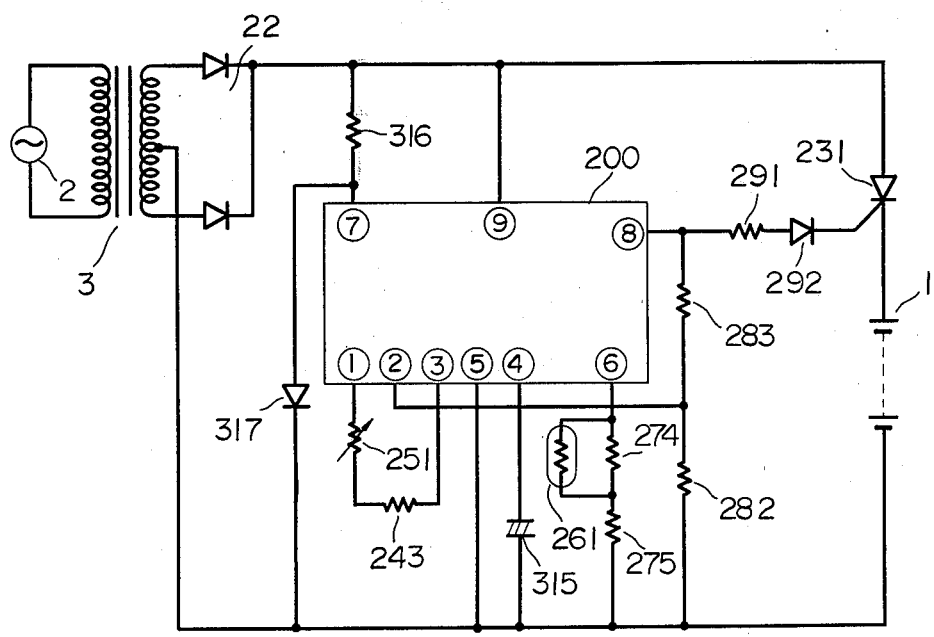
FIG. 22 is a block diagram showing an outline of the inventive charging apparatus implemented in an integrated circuit.
Figure 23:
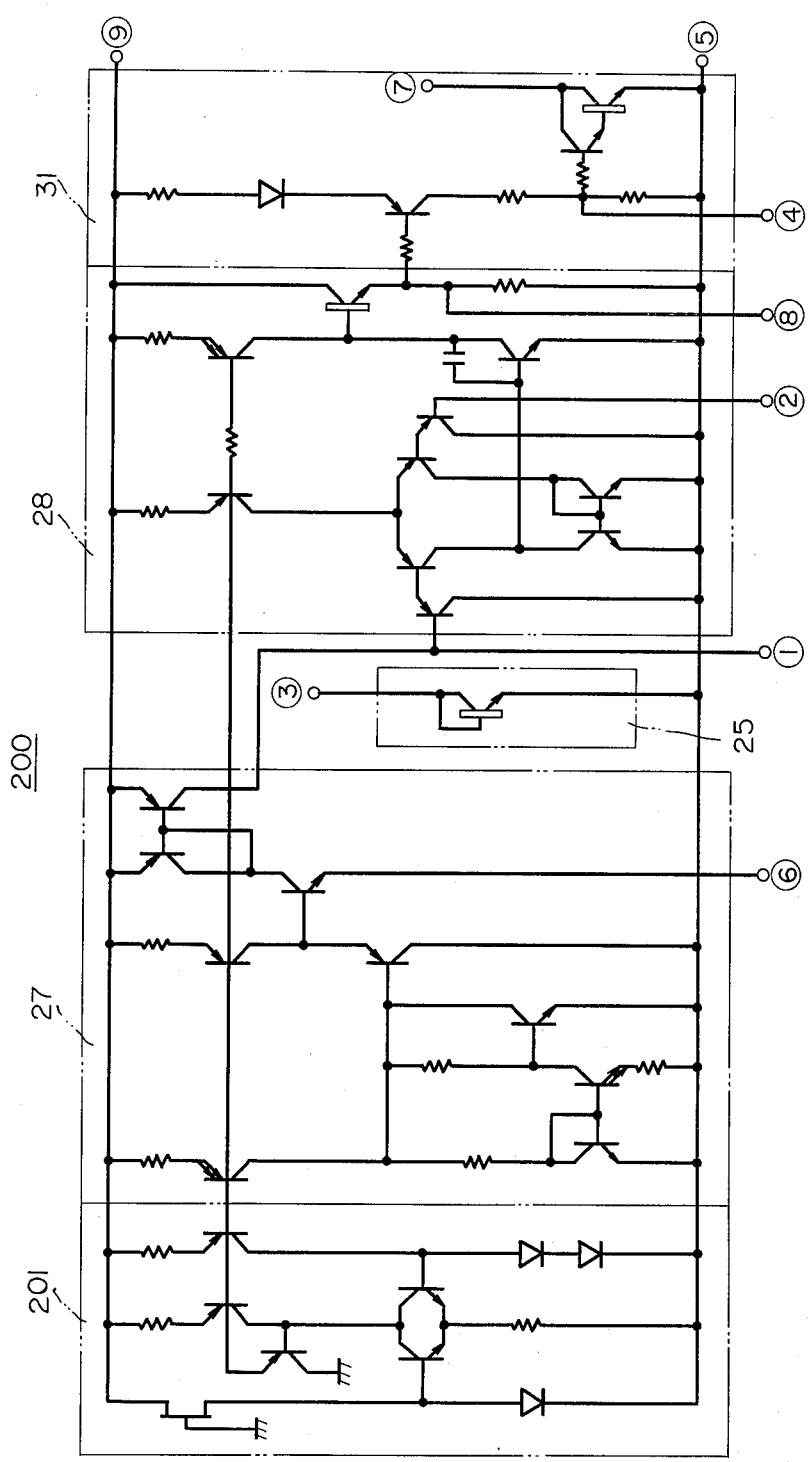
FIG. 23 is a schematic diagram showing one example of the integrated circuit of the FIG. 22 embodiment.

FIG. 22 is a block diagram showing a further embodiment of the present invention. The FIG. 22 embodiment is an example in which a portion or all of the voltage generating circuit 25, the current generating circuit 27 and the reference voltage generating circuit 28 and the charge display circuit 31 are implemented in a integrated circuit 200. The integrated circuit 200 comprises nine terminals ① to ⑨. A series connection of the variable resistor 251 and the resistor 243 is connected between the connection terminals ① and ③. The connectional terminal ② is connected to the junction of the resistors 283 and 282. The connection terminal ④ is connected through the capacitor 315 to the ground level and the connection terminal ⑤ is directly connected to the ground level. The connection terminal ⑥ is connected through a series connection of the resistor 275 and the parallel circuit of the thermistor 261 and the resistor 274 to the ground level. The connection terminal ⑦ is connected through the resistor 316 to the output voltage circuit of the rectifying circuit 22 and is also connected through the light emitting diode 319 to the ground level. The connection terminal ⑧ provides the reference voltage (Vref) and accordingly the terminal ⑧ is connected to the resistor 291 included in the gate drive circuit 29. The connection terminal ⑨ is connected to the output of the recifying circuit 22. Meanwhile, the series connection of the thyristor 31 and the batteries 1 is connected to the rectifying circuit 22 and the gate electrode of the thyristor 31 is supplied with the gate voltage from the diode 292, as in the same manner as in the previously described embodiments. A more detailed structure of the integrated circuit 200, i.e. an equivalent circuit diagram is shown in FIG. 23. Referring to FIG. 23, the circuit 201 is a voltage source circuit for providing a stabilized voltage to the integrated circuit 200. The other circuits 25, 27, 28 and 31 perform the same functions as those of the previously described FIG. 13 embodiment. The respective connection terminal ① to ⑨ are the same as those corresponding ones in FIG. 22. In the case where the major portions are thus implemented in the integrated circuit 200, the integrated circuit 200 is provided in the vicinity of the batteries 1 and so as to be thermally coupled to the batteries 1. However, in the case where the voltage generating circuit 25 is not incorporated in the integrated circuit 200 may be disposed separated from the batteries 1, as is clear. Since the FIG. 13 embodiment was so structured that a zener diode need not be provided for generating the reference voltage (Vref) and any capacitors need neither be provided, the FIG. 13 embodiment can not be implemented in an integrated circuit as shown in FIGS. 22 and 23. In the case of the FIG. 13 embodiment, the zener diode 311 was employed in the charge display circuit 31. However, since the zener diode 313 merely serves to detect whether the output voltage level of the rectifying circuit 22 has become lower than a predetermined value or not, as shown in FIG. 22, a circuit without a zener diode can be readily substituted.

Figure 24:
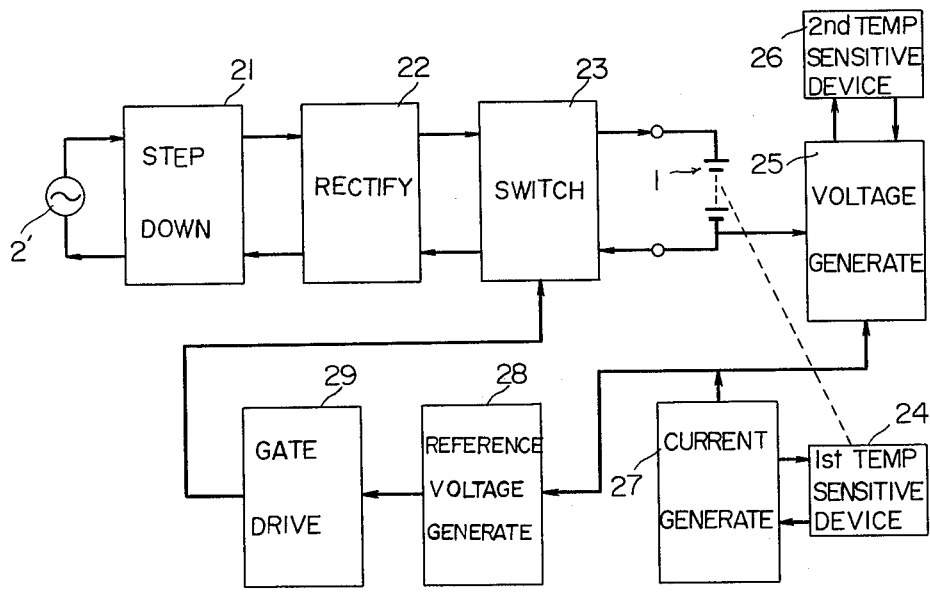
FIG. 24 is a block diagram showing a further embodiment of the present invention.

FIG. 24 is a block diagram showing a further embodiment of the present invention. The embodiment shown is substantially the same as the FIG. 12 embodiment, except for the following respects. More specifically, the embodiment shown is adapted such that the current generating circuit 27 is responsive to the first temperature sensitive device 24 and the voltage generating circuit 25 is responsive to the second temperature sensitive device 26. More specifically, conversely to the FIG. 12 embodiment, the FIG. 24 embodiment is adapted such that the current flowing in the voltage generating circuit 25 is made changeable depending on the temperature (Tb) of the battery 1 and the generated voltage (Vx) is made changeable depending on the ambient temperature (Tamb). Even by structuring the embodiment, it follows that the output voltage (Vref) obtained from the reference voltage generating circuit 28 becomes changeable depending on both the battery temperature and the ambient temperature and as a result substantially the same effect as that of the previously described embodiments is achieved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A charging apparatus for a rechargeable battery, comprising:
    charging current providing means for providing a charging current to said rechargeable battery,
    first temperature detecting function means responsive to the temperature of said rechargeable battery,
    second temperature detecting function means responsive to the ambient temperature,
    current generating means responsive to one of said first and second temperature detecting function means for generating a current which is changeable following the change of the temperature as detected,
    voltage generating means connected to receive said current generated from said current generating means and responsive to the other of said first and second temperature detecting function means for generating a voltage which is changeable following the change of the temperature detected, and
    charge control means responsive to the output voltage of said voltage generating means for controlling said charging current provided from said charging current providing means to said rechargeable battery.

2. A charging apparatus in accordance with claim 1, wherein
    said first temperature detecting function means is adapted to exhibit substantially a linear functional relationship with respect to the change of the temperature of said rechargeable battery, and
    said second temperature detecting function means is adapted to exhibit a non-linear functional relationship with respect to the change of said ambient temperature.

3. A charging apparatus in accordance with claim 2, wherein said current generating means is responsive to said first temperature detecting function means for generating said current which is changeable in proportion to the change of the temperature of said rechargeable battery, and said voltage generating means receives said current which is changeable in proportion to the change of the voltage of said rechargeable battery and is responsive to said second temperature detecting function means to generate said voltage which is changeable in a non-linear manner with respect to the change of said ambient temperature.

4. A charging apparatus in accordance with claim 2, wherein said current generating means is responsive to said second temperature detecting function means to generate said current which is changeable in a non-linear manner with respect to the change of said ambient temperature, and said voltage generating means receives said current which is changeable in a non-linear manner with respect to the change of said ambient temperature to generate said voltage which is changeable in a non-linear manner with respect to the change of the temperature of said rechargeable battery.

5. A charging apparatus in accordance with claim 4, wherein said first temperature detecting function means comprises a diode junction disposed in the vicinity of said rechargeable battery, and said voltage generating means generates said voltage in proportion to a forward voltage drop across said diode junction, and said current generating means forms a current path through said diode junction.

6. A charging apparatus in accordance with claim 5, wherein said second temperature detecting function means comprises a resistive temperature sensitive device, and said resistive temperature sensitive device is included in said current path of said current generating means.

7. A charging apparatus in accordance with claim 6, wherein said resistive temperature sensitive device comprises a thermistor.

8. A charging apparatus in accordance with claim 1, wherein said charge control means comprises a switching element interposed between said charging current providing means and said rechargeable battery, and switching element controlling means responsive to the output voltage from said voltage generating means for controlling said switching element.

9. A charging apparatus in accordance with claim 8, which further comprises reference voltage generating means responsive to the output voltage from said voltage generating means for generating a reference voltage which is proportional to said output voltage from said voltage generating means, and wherein said switching element controlling means is adapted to control said switching element to be non-conductive when said reference voltage obtained from said reference voltage generating means and the voltage of said rechargeable battery become substantially equal to each other.

10. A charging apparatus in accordance with claim 9, wherein said switching element comprises a switching element having an input electrode, an output electrode and a control electrode, and said switching element is connected such that said control electrode receives said reference voltage from said reference voltage generating means, said input electrode is connected to said charging current providing means, and said output electrode is connected to said rechargeable battery, whereby said switching element is rendered non-conductive when the difference between the voltage of said control electrode and the voltage of said output electrode becomes smaller than a predetermined switching voltage.

11. A charging apparatus in accordance with claim 10, wherein said rechargeable battery has a predetermined voltage at charge completion, and which further comprises temperature characteristic setting means for setting the temperature characteristic of the total of said voltage at charge completion and said switching voltage and the temperature characteristic of said reference voltage from said reference voltage generating means to be substantially the same.

12. A charging apparatus in accordance with claim 10 or 11, wherein said switching element having an input, output and control electrodes comprises a silicon controlled rectifier.

13. A charging apparatus in accordance with claim 1, which further comprises voltage characteristic adjusting means for making said output voltage from said voltage generating means consistent with a predetermined change characteristic.

14. A charging apparatus in accordance with claim 13, wherein said voltage characteristic adjusting means comprises a resistive element.

15. A charging apparatus in accordance with claim 14, wherein said resistive element comprises a variable resistor.

16. A charging apparatus in accordance with claim 14, wherein said resistive element comprises
a plurality of fixed resistors, and
selecting means for selecting said plurality of fixed resistors.

17. A charging apparatus in accordance with claim 1, which further comprises current characteristic adjusting means for making said current from said current generating means consistent with a predetermined characteristic.

18. A charging apparatus in accordance with claim 17, wherein said voltage adjusting means comprises a resistive element being inserted in a current path of said voltage generating means.

19. A charging apparatus in accordance with claim 18, wherein said resistive element comprises a variable resistor.

20. A charging apparatus in accordance with claim 18, wherein said resistive element comprises
a plurality of fixed resistors, and
selecting means for selecting said plurality of fixed resistors.

21. A charging apparatus for a rechargeable battery, comprising:
charging current providing means for providing a charging current to said rechargeable battery,
switching means having a control electrode interposed between said charging current providing means and said rechargeable battery and responsive to a control voltage being applied to said control electrode for implementing a switching operation,
first temperature detecting function means responsive to the temperature of said rechargeable battery,
second temperature detecting function means responsive to the ambient temperature, and
control voltage generating means responsive to said first and second temperature detecting function means for generating a control voltage which is changeable following the changes of said battery temperature and ambient temperature to said control electrode of said switching means, said control voltage generating means including,
current generating means, and
reference voltage generating means responsive to said current from said current generating means for generating a reference voltage for affording said control voltage.

22. A charging apparatus of a rechargeable battery in accordance with claim 21, wherein
one of said current generating means and said reference voltage generating means is responsive to said first temperature detecting function means, and
the other of said current generating means and said reference voltage generating means is responsive to said second temperature detecting function means.

23. A charging apparatus of a rechargeable battery in accordance with claim 21, wherein
said reference voltage generating means is responsive to both said first and second temperature detecting function means.

24. A charging apparatus of a rechargeable battery in accordance with claim 23, wherein
said current generating means comprises constant current source means for providing a constant current, and
said reference voltage generating means includes,
voltage generating means responsive to said constant current from said constant current source means and responsive to one of said first and second temperature detecting function means for generating a voltage, and
voltage amplifying means for amplifying the output voltage from said voltage generating means and responsive to the other of said first and second temperature detecting function means.

25. A charging apparatus of a rechargeable battery in accordance with claim 21, wherein
said reference voltage generating means comprises
voltage generating means responsive to said current from said current generating means and responsive to one of said first and second temperature detecting function means for generating a voltage,
amplifying means for amplifying the output voltage from said voltage generating means, and
switching element driving means for providing said output voltage from said amplifying means to said control electrode of said switching means as said control voltage and being responsive to the other of said first and second temperature detecting function means.

26. A charging apparatus of a rechargeable battery in accordance with any one of the preceeding claims 21, 22, 23, 24 or 25, wherein
said first temperature detecting function means is adapted to exhibit substantially a linear functional relationship with respect to the temperature change of said rechargeable battery, and
said second temperature detecting function means is adapted to exhibit a non-linear functional relationship with respect to the change of said ambient temperature.

27. A charging apparatus of a rechargeable battery in accordance with claim 26, wherein
said first temperature detecting function means comprises a diode junction thermally coupled to said rechargeable battery.

28. A charging apparatus of a rechargeable battery in accordance with claim 26, wherein
said second temperature detecting function means comprises a resistive temperature sensitive device.

29. A charging apparatus of a rechargeable battery in accordance with claim 28, wherein
said resistive temperature sensitive device comprises a thermistor.

* * * * *